United States Patent

[11] 3,592,398

[72] Inventor Kunihiko Mukai
 Tsu, Japan
[21] Appl. No. 873,147
[22] Filed Nov. 3, 1969
[45] Patented July 13, 1971
[73] Assignee Nippon Glass Fiber Co., Ltd.
 Tsu, Mie Prefecture, Japan

[54] APPARATUS FOR USE IN MAKING A FIBER BUNDLE FOR CONDUCTING OPTICAL IMAGES
 6 Claims, 9 Drawing Figs.
[52] U.S. Cl. .................................................. 242/18,
 242/47
[51] Int. Cl. ....................................................... B65h 54/00
[50] Field of Search ........................................ 242/18, 18
 G, 42, 47, 53, 54

[56] References Cited
UNITED STATES PATENTS
| | | | |
|---|---|---|---|
| 3,229,925 | 1/1966 | Ballmer ........................ | 242/18 G |
| 3,248,063 | 4/1966 | Sheldon et al. ............... | 242/18 G |
| 3,506,208 | 4/1970 | Davy et al. .................... | 242/18 |

Primary Examiner—Standley N. Gilbreath
Attorney—Holcombe, Wetherill & Brisebois

ABSTRACT: Apparatus for making a cable for conducting optical images from elongated glass fiber which comprises a rotatable support carrying projections which constitute a reel for the fiber and guide pins between two successive projections which constrain said fiber into a layer one fiber thick.

PATENTED JUL 13 1971

INVENTOR
KUNIHIKO MUKAI

BY Holcombe, Wetherill & Brisebois

ATTORNEYS

INVENTOR
KUNIHIKO MUKAI
ATTORNEYS

APPARATUS FOR USE IN MAKING A FIBER BUNDLE FOR CONDUCTING OPTICAL IMAGES

SUMMARY OF THE INVENTION

The present invention relates to apparatus for use in making a cable of fibers which will conduct an optical image, and particularly relates to apparatus for making such a conductive cable from small-diameter, optical-image-conducting long fibers or filaments, for example, small-diameter long glass fibers, or small-diameter long fibers of synthetic resin.

The object of this invention is to provide means for making an optical-image-conductive cable from long synthetic resin filaments under definite conditions, said synthetic resin filaments being formed with a cover layer of low-refractive transparent synthetic resin around a core of high-refractive transparent synthetic resin; or of making an optical-image-conductive cable from long glass filaments under definite conditions, said glass filaments being formed with a cover layer of low-refractive transparent glass around a core of high-refractive transparent glass.

This apparatus is used in carrying out a method of manufacturing this special fiber cable, said method being characterized by the steps of forming a plurality of parallel fibers into an annular band in one zone of which the fibers are parallel to each other and lie in a single plane; superposing and bonding the zones of a plurality of such bands together, and cutting the resulting annular cable near the middle of the section formed by the bonded zones so that the cut portion forms the two ends of the final cable.

The above-mentioned optical-image-conductive fiber cable can be easily and economically produced by using the simple apparatus according to this invention.

Other objectives and advantages of this invention will become apparent upon reading the following description of a preferred embodiment of this invention, with reference to the accompanying drawings, in which.

Figure 1:
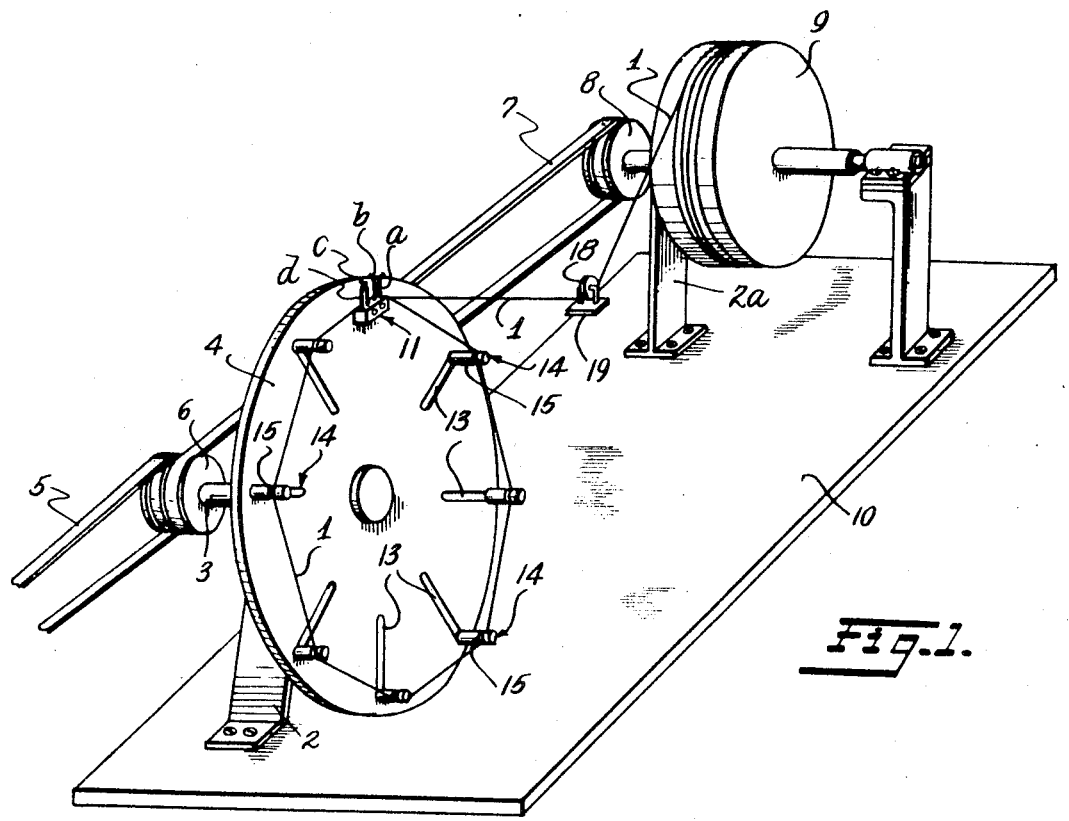
FIG. 1 is a perspective view showing the apparatus according to the invention, which is strictly speaking, used in making an intermediate product utilized in manufacturing an image-conducting cable.

FIG. 1 shows a machine for manufacture an intermediate product as a first step in the process of producing an image-conducting cable. A rotating disc 4 for winding the fiber is fixed to the rotating shaft 3 carried by the bearing 2 set up on the base 10. This disc is driven in the direction indicated by the arrow through reduction gearing (not shown), the belt 5, and the belt pulley 6, by a motor (not shown). A drum 9 at the other end of the base is mounted on a rotating shaft carried in another bearing 2a and driven from the pulley 6 through the belt 7 and pulley 8. This drum carries a long strand of optical-image-conducting fiber, which is drawn off the drum and rewound on the disc 4 when the drum and disc are rotated.

Figure 2:
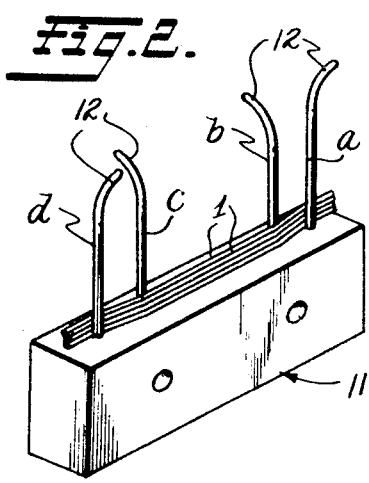
FIG. 2 is a perspective view showing on an enlarged scale the fiber guide of the apparatus shown in FIG. 1.
Figure 3:
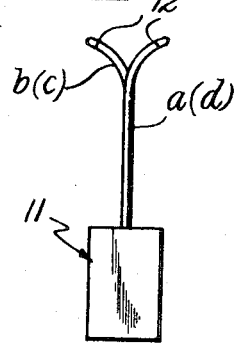
FIG. 3 is an end view showing said fiber guide.

The disc 4 has a fiber guide 11 mounted near its periphery. As seen in FIGS. 2 and 3, the fiber guide 11 has on its top four fiber-guiding needles $a$, $b$, $c$, $d$, each with a curved upper tip 12, mounted in pairs. These guiding needles $a$, $b$, $c$, $d$ are arranged as shown in FIG. 3 in a straight line, with the curved tips of $a$ and $d$ leaning to the right and those of $b$ and $c$ leaning to the left.

Figure 6:
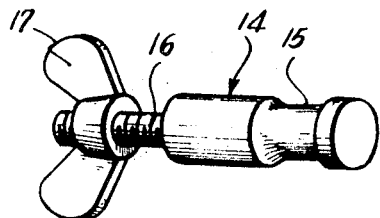
FIG. 6 is a perspective view of a fiber-guiding pin.

A plurality of radially extending slots 13 in the disc 4 are respectively pierced by the threaded bases 16 of fiber-supporting pins 14 provided with groove 15 as shown in FIG. 6. Depending on the length of the optical-image-conducting fiber cable to be produced, the pins 14 are shifted to appropriate positions in the long grooves 13 and retained in said positions by thumbscrews 17 threaded onto the ends of the pins which project from the back of the disc 4.

Figure 7:
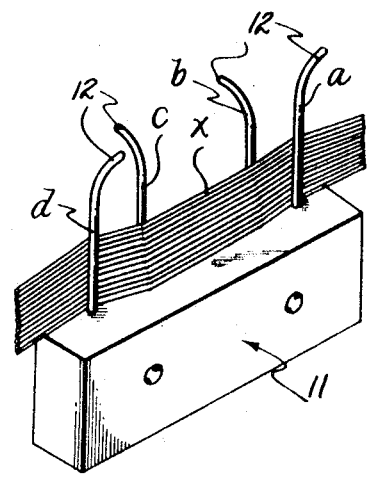
FIG. 7 is a perspective view showing the manufacture of an intermediate product.
Figure 8:
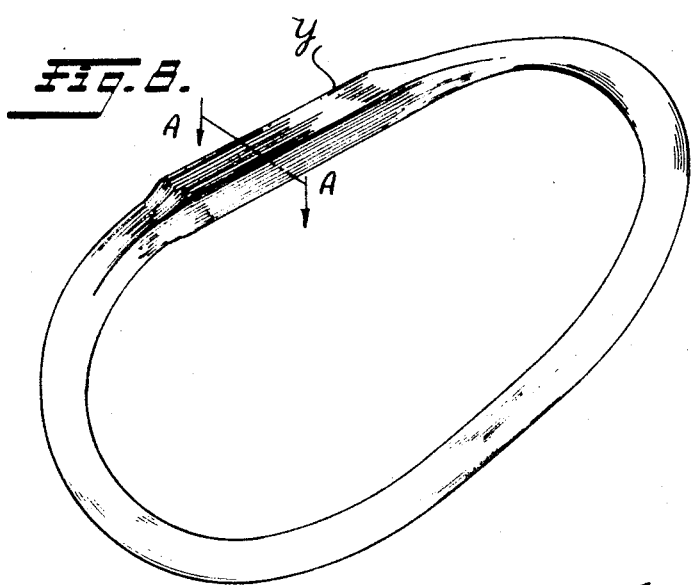
FIG. 8 is a perspective view of an optical-image-conducting fiber cable just before completion.
Figure 9:
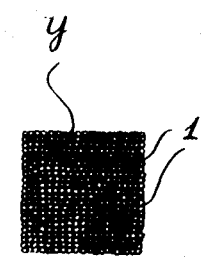
FIG. 9 is an end view of an optical-image-conducting fiber cable as completed.

When the long fiber 1 is drawn off the drum 9, it is stretched taut by a takeup consisting of the pulley 18 and the lightweight 19, and rewound over the fiberguide 11 and the pins 14 on the disc 4. The long fiber 1 weaves around the guiding needles $a$, $b$, $c$, $d$ on the fiber guide 11 as shown in FIG. 2 and each successive turn is superposed on the previous turn, forming a zone (see FIG. 7) in which sections of the fiber 1 are successively arranged in close contact within a single plane. Thus, when the fibers in this zone are bonded together and the portion of the long fiber 1 which has been unwound from the drum 9 is cut off, a band $x$ composed of only long fibers is obtained. This endless intermediate product containing a band $x$ is taken down from the rotating disc 4 and many such intermediate products are superposed one over another at said band $x$ and then bonded together, giving a laminated portion $y$ comprised of long fibers regularly arranged as shown in FIG. 9. When the central part of this laminated portion is cut transversely along A-A, a single piece of optical-image-conductive fiber cable with one half of the laminated portion $y$ at each end is obtained. Since the fibers intermediate the end portions are not bonded together the cable may be flexed and bent at will.

Figure 4:
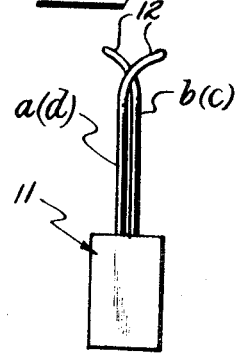
FIG. 4 is an end view showing an alternative type of fiber guide.
Figure 5:
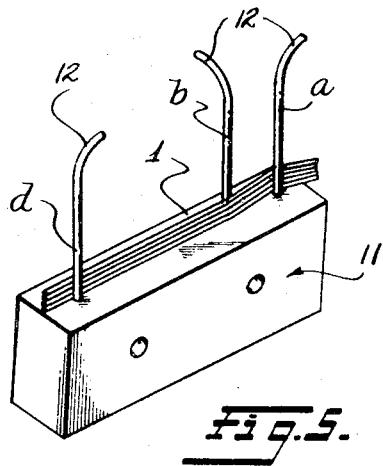
FIG. 5 is an end view showing still another type of fiber guide.

The rotating disc 4 need not always be of the same shape and structure as shown in the drawings, it need only be a spinning body of approximately round shape with at least three fiber-guiding needles positioned in proper alignment within a limited zone on its periphery. The fiber-guiding needles $a$, $b$, $c$, $d$ on the fiber guide 11 need not always be in a straight line as shown in FIG. 3; but may be arranged in staggered fashion as shown in FIG. 4. Alternatively, three needles $a$, $b$, $d$ may be positioned as shown in FIG. 5 on the fiber guide 11, or 5 or 6 needles may be positioned thereon. The drum may, of course, carry a plurality of parallel fibers rather than a single fiber.

In the optical-image-conducting fiber cable thus obtained, an optical image can be transmitted from one end thereof to the other, even though there may be a difference in length between component fibers or arbitrary curvature at an intermediate point along the cable.

What I claim is:

1. Apparatus for use in making a flexible image-conducting cable from at least one continuous filament, which apparatus comprises a support mounted to rotate about an axis, a series of projections extending from said support radially of said axis and forming a reel on which said filament can be wound, and at least three guide pins positioned in the path of said filament between two successive projections, said pins being so aligned that successive turns of filament passing therebetween are constrained to form a layer one filament thick extending between said pins.

2. An apparatus as claimed in claim 1, wherein at least one of said guide pins has a tip bent out of alignment with the remainder of said pin.

3. An apparatus as claimed in claim 1, wherein said apparatus has four fiber-guiding pins arranged in pairs, with their free ends of each pin bent transversely away from the path of travel of said filament.

4. An apparatus as claimed in claim 3, wherein said fiber-guiding pins are aligned in a single plane.

5. An apparatus as claimed in claim 3, wherein said fiber-guiding pins are arranged in staggered fashion on opposite sides of the path traversed by said filament between said two successive projections.

6. Apparatus as claimed in claim 1 comprising three fiber-guiding pins, the free ends of two of said pins being inclined in one direction and that of the other pin being inclined in the opposite direction, both inclinations being transversely away from the path of travel of said filament.